Feb. 3, 1959
C. M. THRASHER
2,872,557
AUXILIARY OVEN FOR ELECTRIC STOVES
Filed Jan. 7, 1957
2 Sheets-Sheet 1
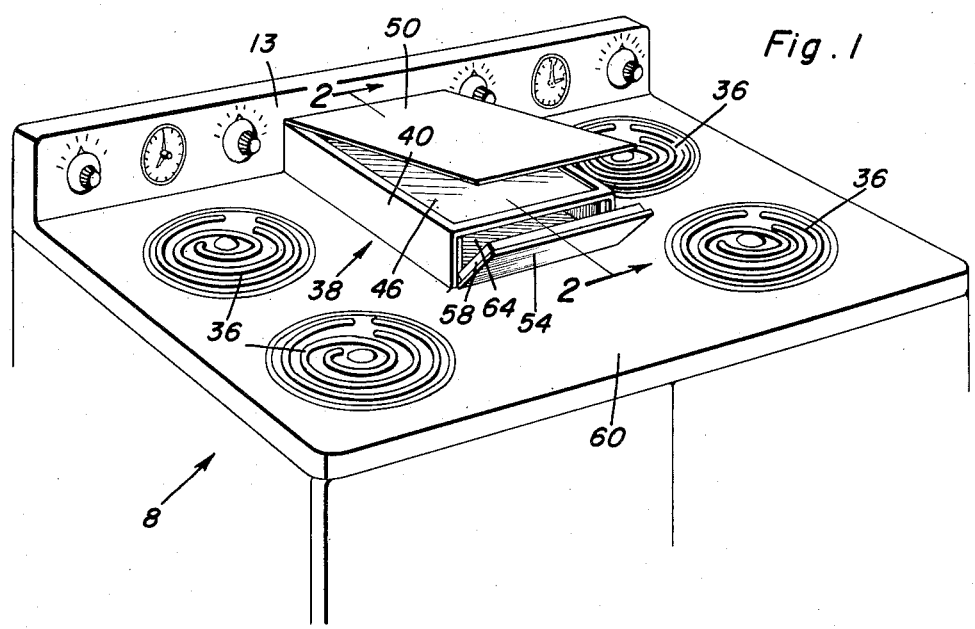
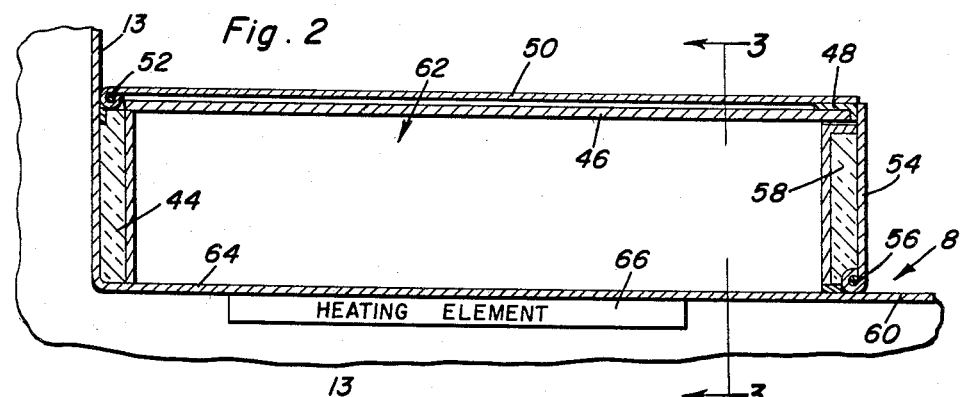
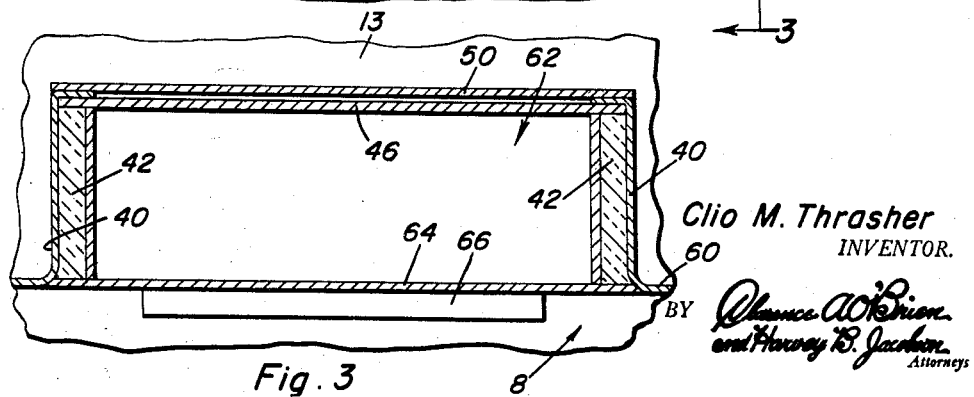
Clio M. Thrasher
INVENTOR.
BY
Clarence A. O'Brien
and Harvey B. Jackson
Attorneys Feb. 3, 1959
C. M. THRASHER
2,872,557
AUXILIARY OVEN FOR ELECTRIC STOVES
Filed Jan. 7, 1957
2 Sheets-Sheet 2
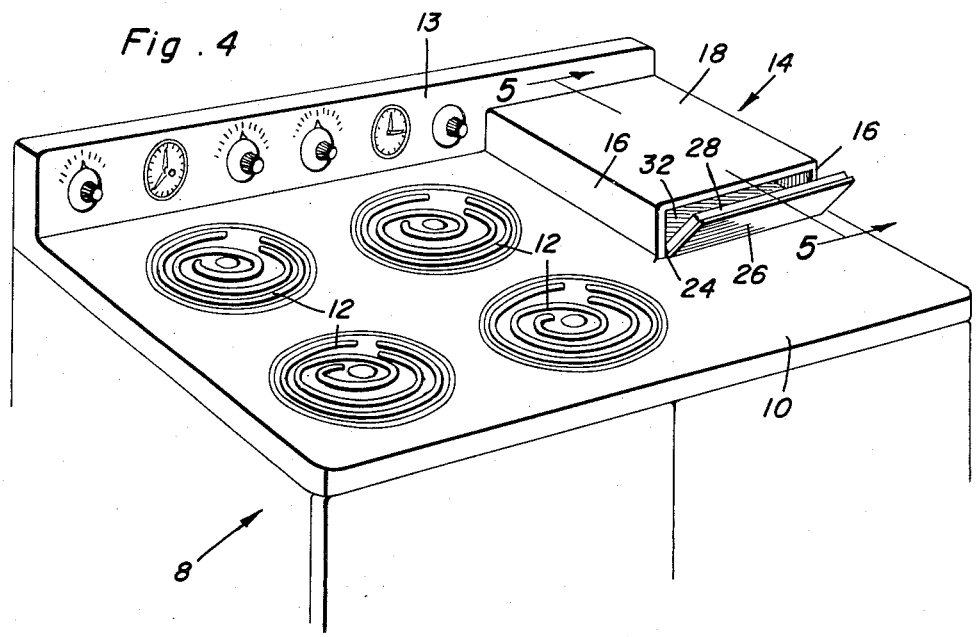
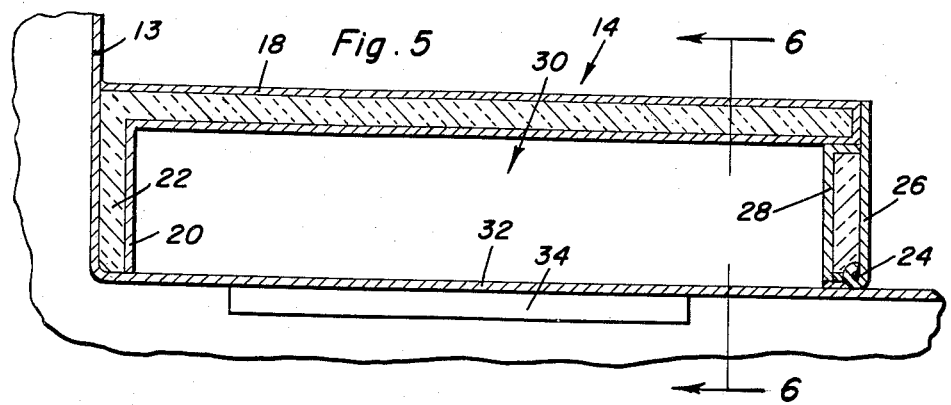
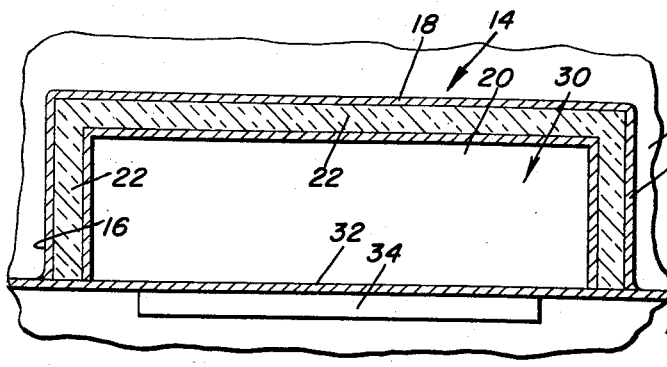
Clio M. Thrasher
INVENTOR.

UnitedStatesPatentOffice 2,872,557
Patented Feb. 3, 1959

2,872,557

AUXILIARY OVEN FOR ELECTRIC STOVES

Clio M. Thrasher, Angola, Ind.

Application January 7, 1957, Serial No. 632,791

2 Claims. (Cl. 219—35)

The present invention relates to an electric kitchen range or cook stove wherein the over-all utility of the same is appreciably increased by an added or auxiliary so-called economy oven which lends itself to use as a practical food warmer and also increases the baking and cooking facilities of the stove.

It is a matter of common knowledge that the ordinary electric kitchen range is equipped with a flat top having a plurality of selectively usable burners accessibly incorporated therein. Manifestly, the degree of usefulness of this fully exposed area of the stove structure is dependent on the number of burners and other usable facilities offered. As a general rule there exists available space on the stove top and which does not interfere with the burner and is generally employed as a shelf for utensils and the like. It has been ascertained after thoughtful consideration that a goodly portion of the available shelf space may be satisfactorily, and usually without complaint from users, utilized to accommodate a built-on or added oven which, though relatively small, nevertheless, constitutes a practical and efficient complement to the stove.

As is evident from the above the present invention therefore pertains to the provision of an oven which is simple, practical, efficient and which may be heated from an easily added electric heating element suspended underneath of the top and below the chamber or space in the stated oven.

Briefly, the invention pertains to an electrically operated kitchen stove having an exposed top wall equipped with burners, and an added economy type insulated oven operatively superimposed atop a limited areal portion of said top wall in a position out of the way of said burners, the underlying portion of said top wall constituting the bottom of said oven.

Novelty is also predicated on said oven wherein the top of the oven itself is constructed to incorporate a griddle-type grill therein, whereby the oven offers the added usefulness of an easily accessible built-in grill.

Other objects, features and advantages will become more readily apparent from the following description and the accompanying sheet of illustrative drawings.

In the drawings, wherein like numerals are employed to designate like parts throughout the views:

Figure 1 is a fragmentary perspective view of a conventional type of electric kitchen range or cook stove and showing the improved auxiliary or added oven and how it is constructed, mounted and used;

Figure 2 is a section on an enlarged scale also fragmentary in form and taken on the plane of the line 2—2 of Figure 1 looking in the direction of the arrows;

Figure 3 is a section at right angles taken on the vertical line 3—3 of Figure 2;

Figure 4 is a perspective view similar to Figure 1 showing the oven in slightly simplified or revised form and in a different position on the top of the stove;

Figure 5 is a longitudinal section on an enlarged scale on the plane of the line 5—5 of Figure 4; and Figure 6 is a section on the line 6—6 of Figure 5.

There are two embodiments of the invention illustrated and these, generically speaking, are much the same. Reference is had to Figures 1 to 3 showing one form of the invention and then to Figures 4 to 6, inclusive, showing the other form of the invention.

In both forms of the invention the kitchen range or stove, which is electric in type, is denoted generally by the numeral 8. The present invention concerns itself with the top structure, that is the top wall 10 and perhaps the control panel or equivalent vertical structure 12 along the rear edge portion of the top wall. In the simpler form of the invention in Figures 4 to 6 inclusive there are four top conventional type burners and these are denoted by the numeral 12. These burners are grouped to the left of the top and therefore the right hand portion of the top is flat and imperforate and is here used as the support means for the added or auxiliary or economy oven 14. This oven is of simple construction and of somewhat flat elongate rectangular form in plan. It comprises longitudinal side walls 16, a top wall 18 and a back wall 20 which abuts the panel 12. These walls are interiorly insulated in any appropriate manner as denoted at 22. The front wall is hingedly mounted at 24 and constitutes an openable and closable hinged door 26. It also is suitably interiorly insulated at 28. The oven space or chamber is denoted at 30. It will be seen particularly in Figures 5 and 6 that the portion of the top 10 which underlies the oven as at 32 constitutes the bottom of the oven. The oven is fixed in place in any suitable manner and is a permanent part of the stove top. An appropriate electric heating element 34 is provided and is mounted on the underneath side of the portion 32 so that the heat radiated to the surface 32 is trapped in the oven space to be utilized in a well known manner. The means of mounting and supplying current from the electric element will vary and are not detailed here. In fact it is conceivably within the purview of this invention to omit the electric heating element and to use this added oven as a food warmer taking the heat from the heated top 10 and perhaps the main oven or ovens within the stove when the latter are on.

The slightly different construction constituting the modification seen in Figures 1 to 3 inclusive is basically the same. Here the burners 36 are arranged in paired relationship to the left and right of the central portion of the top and therefore it is on this central portion that the added or auxiliary oven 38 is mounted. Here again vertical side walls 40 are provided and are suitably insulated on their interior surfaces as at 42 and the insulated back wall is much the same and is denoted at 44. In this arrangement the top of the oven is of composite construction. That is to say the plate 46 is mounted in a frame 48 and constitutes an appropriate griddle or grill for use in an obvious manner. The numeral 50 designates a plate which covers the grill and is hingedly mounted at the back as at 52 and swings up to expose the grill and therefore serves as a cover for the grill. It may be swung up and out of the way when the grill is in use or dropped down to closed position as seen in Figure 2 when the grill is not in use and the oven proper is employed. The front wall 54 is hingedly mounted at 56 and suitably insulated at 58. The stove top on which the oven is mounted is denoted generally by the numeral 60 and that portion thereof which is in alignment with the oven space or chamber 62 is denoted by the numeral 64 and as before stated constitutes the bottom of the oven and carries the electric heating element 66 as shown in Figures 2 and 3.

It is submitted that the invention disclosed is an innovation in electric stove constructions. Although simple, practical and economical in construction it nevertheless provides an appreciated added degree of usefulness to the stove top.

The manner of constructing, mounting and using the oven and its facilities is thought to be clear from the drawings and the description. Therefore, a more lengthy description is thought to be unnecessary.

Minor changes in shape, size, materials and rearrangement of the parts may be resorted to in actual practice without departing from the spirit of the invention or the scope of the subjoined claims.

What is claimed as new is as follows:

1. In combination, a stove having an exposed top wall equipped with accessible burners, and an auxiliary economy-type insulated oven operatively superimposed atop a limited areal portion of said top wall in a space and position out of the way of said burners but at a point of vantage and readily accessible, an underlying portion of said top wall constituting the bottom of said oven, said oven having a hingedly mounted easily accessible front wall serving as a door, the top wall of said oven comprising a flat heat absorbing and radiating plate suitably usable as an article supporting and warming surface, and a hinged top portion serving as a cover for said top wall.

2. For use on and in conjunction with a kitchen range which has an exposed top wall provided with constantly accessible burners, and an available space between burners, such as is customarily used for supporting utensils and the like; a readily applicable ready-to-use economy appliance comprising a relatively small auxiliary oven which is open at its bottom and is adapted to rest immediately upon the top of said range using the heat radiated from said top as a source of warming heat for the interior of said oven and embodying insulated vertical side walls connected together by intervening transverse end walls, one of said end walls being fixed and the other end wall hingedly mounted to provide a downwardly swinging door for what becomes the open front of said auxiiary oven, a metal top wall incorporated in said oven and constituting a food supporting and warming plate, and a cover for lidding over said top wall, said cover being hingedly mounted at one end on the fixed end wall.

References Cited in the file of this patent

UNITED STATES PATENTS

| | | |
|---|---|---|
| 1,141,175 | Copeman | June 1, 1915 |
| 1,187,156 | Langhorne | June 13, 1916 |
| 1,190,584 | Reese | July 11, 1916 |
| 2,501,935 | Fader | Mar. 28, 1950 |
| 2,584,187 | Crist | Feb. 5, 1952 |
| 2,785,266 | Lewis | Mar. 12, 1957 |
| 2,786,929 | Michaelis | Mar. 26, 1957 |